United States Patent [19]

Perry

[11] Patent Number: 5,134,783

[45] Date of Patent: Aug. 4, 1992

[54] THREAD TIMING FOR A ROTARY SHOULDERED CONNECTION

[75] Inventor: Carl A. Perry, Middletown, Conn.

[73] Assignee: Teleco Oilfield Services Inc., Meriden, Conn.

[21] Appl. No.: 723,455

[22] Filed: Jun. 28, 1991

[51] Int. Cl.$^5$ .............................. G01B 3/36; G01B 3/48
[52] U.S. Cl. .................................... 33/645; 33/199 R; 33/501.19; 33/201; 33/542
[58] Field of Search .................. 33/645, 501.19, 201, 33/534, 533, 532, 531, 199 R, 613, 626, 542, 545, 502

[56] References Cited

U.S. PATENT DOCUMENTS

| | | | |
|---|---|---|---|
| 2,561,759 | 7/1951 | Steczynski | 33/199 R |
| 4,356,636 | 11/1982 | Roberts | 33/531 |
| 4,417,402 | 11/1983 | Hattan | 33/199 R |
| 4,934,059 | 6/1990 | Green | 33/199 R |
| 5,020,230 | 6/1991 | Greenslade | 33/199 R |

Primary Examiner—William A. Cuchlinski, Jr.
Assistant Examiner—C. W. Fulton
Attorney, Agent, or Firm—Fishman, Dionne & Cantor

[57] ABSTRACT

A method of thread timing for a rotary shouldered connection is presented. A ring gage which has a first and second scribe line thereon is used to establish a male timed rotary connection of a first tool. The angular distance between the first and second scribe lines is the advance timing correction (ATC), i.e., the angular distance between hand tight face-up and full torque make-up of a rotary connection comprising the male timed rotary connection of the first tool and a female timed rotary connection of a second tool. The second scribe line (indicative of the ATC) is transferred onto the first tool. A pin gage which has a third scribe line thereon is used to establish the female connection of the second tool. The third scribe line on the pin gage corresponds to the first scribe line on the ring gage. The third scribe line is transferred onto the second tool. When the first and second tools are rotatively connected at full torque, the transferred lines on the tools are in general angular alignment. These transferred lines provide the angular data for machining of the tools (e.g., machining of hatches or other features to house directional formation evaluation sensors or the like).

32 Claims, 2 Drawing Sheets

THREAD TIMING FOR A ROTARY SHOULDERED CONNECTION

BACKGROUND OF THE INVENTION

This invention relates generally to a method for interconnecting and manufacturing tubular drill string components. More particularly, this invention relates to a method for angularly aligning adjacent tubular drill string components such as formation evaluation tools or drill collars.

Deep wells of the type commonly used for petroleum or geothermal exploration are typically less than 30 cm (12 inches) in diameter and on the order of 2 km (1.5 miles) long. These wells are drilled using drill strings assembled from relatively light sections (either 30 or 45 feet long) of steel drill pipe that are connected end-to-end by tool joints, additional sections being added to the uphole end as the hole deepens. The downhole end of the drill string typically includes a drill collar, formation evaluation tools and a dead weight section assembled from relatively heavy lengths of uniform diameter steel tubes ("drill collars") having an overall length on the order of 300 meters (1000 feet). A drill bit is attached to the downhole end of the lowermost drill collar, the weight of the collar causing the bit to bite into the earth. The drill string is either rotated from the surface to turn the bit, or a downhole mud motor or turbine is used to turn the bit while the drill string is fixed (i.e., not rotating). Drilling mud or air is pumped from the surface to the drill bit through an axial hole in the drill string. This fluid removes the cuttings from the hole, can provide a hydrostatic head which controls the formation fluids, and provides cooling for the bit.

Measurement-while-drilling (MWD) systems generally comprise a plurality of sensors disposed in drill collars of a drill string. When the drill string is rotated, the sensors, whether providing focused measurements (e.g., neutron porosity or gamma ray density) or general measurements, measure the formation from all angular directions.

However, when downhole motors are employed to turn the drill bit, the drill string does not rotate. This poses a problem for sensors that are direction sensitive (i.e., provide focused measurements). When the focused sensors are located in different drill collars, the sensors generally measure the formation from different angular directions. The information collected from the several sensors is best interrupted when the formation measurements originate from the same general angular direction. The prior art has addressed this problem by employing spacers or shims between adjacent drill collars having sensors mounted therein (i.e., subs), to provide angular alignment of the sensors. However, the use of shims can be undesirable because of difficulties associated with spacing tapered threads and installation on the rig floor.

SUMMARY OF THE INVENTION

The above-discussed and other drawbacks and deficiencies of the prior art are overcome or alleviated by the method of the present invention for angularly aligning adjacent drill collars. In accordance with the present invention, the method comprises a first step of scribing a ring gage with a zero degree mark indicative of hand tight face-up and a corresponding degree mark indicative of full torque make-up, referred to herein as the advanced timing connection or ATC mark. This scribed ring gage is then used to manufacture a first tool. The first tool comprises a first drill collar, which is intended to have at least one hatch with a sensor disposed therein as described in U.S. patent application Ser. Nos. 510,082 filed Apr. 17, 1990 and 641,744 filed Jan. 15, 1991, both of which are assigned to the assignee hereof and incorporated herein by reference. The ring gage is installed on the first drill collar at a pin timed rotary connection. It will be appreciated that only the pin and box connections of the first drill collar have been machined at this stage. The ring gage is rotatively connected to the pin end of the drill collar until tight in accordance with the American Petroleum Institute Specification 7, Section 12.7 (set out below and referred to herein as API SPEC 7:

"12.7 Determination of Standoff. Mating and interchange standoff—shall be determined as follows:

a. During the test all pieces entering into the measurement shall be at a uniform temperature near 68° F.
b. Gages shall be benzol clean before mating and made up with a thin film of medicinal mineral oil of a grade and viscosity equal to Nujol, Squibb's liquid petroleum, etc., wiped on the threads with clean chamois skin or bristle brush.
c. The pair shall be mated hand tight without spinning into place, and complete register shall be accomplished with the torque hammer specified for each size.
d. The number of torque hammer blows is unimportant. Sufficient number should be made so that continued hammering will not move ring relative to plug. When testing, the plug gage should be rigidly held, preferably in a vise mounted on a rigid work bench. When so held, 12 torque hammer blows should be sufficient to make completed register.")

and the standoff is then measured. If the standoff is not within a specified tolerance, then the shoulders are faced off to achieve the correct standoff.

When the ring gage is properly installed, the ATC mark from the ring gage is transferred onto the first drill collar. This becomes the center line or angular datum for all subsequent machined features of the first drill collar. The hatches may now be located with respect to this datum (i.e., the center line).

The method of this invention further comprises scribing a plug gage with a zero degree mark indicative of the rotary connection's angular position at hand tight face-up. The plug gage is used to manufacture a second tool. The second tool comprises a second drill collar which is intended to have at least one hatch or feature with a sensor disposed therein. The plug gage is rotatively connected to the box end until tight in accordance with API SPEC 7 and the standoff is then measured. If the standoff is not within a specified tolerance, then the shoulder is faced off to achieve the correct standoff.

When the plug gage is properly installed, the zero degree mark from the plug gage is transferred onto the second drill collar. This becomes the center line or angular datum for all subsequent machined features of the second drill collar. The hatches or features may now be located with respect to the center line.

When the first and second tools are completed, the alignment can be checked by the ring and plug gages.

Each rotary connection (i.e., the pin of the first drill collar and the box of the second drill collar) are verified with corresponding gages. The gages are again installed and the standoff height for each is verified. The center line (i.e., angular datum) of the tools should correspond with the ATC mark for the ring gage and the zero degree mark for the plug gage.

If the tool does not meet the tolerances, the pin end of the first tool may be reworked. Rework requires remachining of the rotary connection until the tolerances are met. Further damaged tools from the field can be reworked in this same manner.

The present invention assures angular alignment when the pin from the first tool and the box from the second tool are rotatively connected to full torque. Full torque make-up must be determined for each size tool for which this method is to be employed. Upon full torque, the center line of the first tool (ATC mark) and the center line of the second tool (zero degree mark) are aligned within a specified tolerance. Thus, the sensors located in hatches or features of both tools can be aligned since they were located with respect to the center lines, which are now in alignment.

Additional tools (i.e., drill collars having at least one hatch or feature with a sensor disposed therein) may also be aligned to form a string of tools, all of which may be in angular alignment. This may require that the threads of the pin end of the tool to be added be recalculated and recut to bring the ATC mark of the additional tool in alignment with the center line (zero degree mark) of the tool to which it is to be rotatively connected.

The present invention eliminates the need of the prior art spacers and shims to bring adjacent tools into alignment. The markings on the tools of the present invention allow for visual verification of proper alignment in the field.

The above-discussed and other features and advantages or the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

I. ESTABLISHING MASTER GAGES

Figure 1:
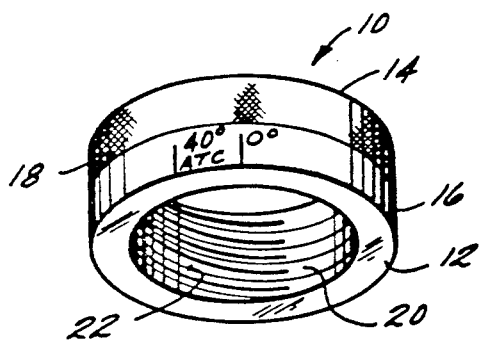
FIG. 1 is a perspective view of a ring gage in accordance with the present invention.

In accordance with a preliminary step of the present invention, master or reference ring and plug gages must be established, from which working plug and ring gages gages are made. This is accomplished for a ring gage using the following procedure:

A horizontal rotary indexing head with a three jaw chuck and an angular caliper control, such as Yuasa #550-008, for holding the master ring gage, is located on a surface plate, such as Starrett 3'×2' GRADE A. The surface plate is required because an extremely level surface is needed to meet tolerances described hereinafter. The master ring gage is secured in the jaw chuck of the rotary indexing head. The indexing head is then set to 0° by the caliper control. A height stand equipped with a micrometer, such as Mitutoyo #505-645-50, is used to locate the center of the master ring gage. When the center has been located, the stand is positioned at the outer surface of the master ring gage. The stand is also equipped with a carbide scriber for scribing the outer surface of the master ring gage. The surface of the master ring gage is coated with a blue dye, and then scribed at the center height location and later marked 0°.

The indexing head is now advanced by the angular distance indicative of full torque make-up. For example, a 6¾" NC 46 MOD. CON. drill collar has an empirically determined angular advancement of 40° from hand tight face-up to full torque make-up (approximately 23,000 FT-LB).

This angular advancement is herein referred to as advance timing correction (ATC). Therefore, in this example the indexing head is advanced by 40°. The height stand still at the center height, now points t a location on the outer surface of the master ring gage to be coated with the blue dye, then scribed and later marked 40° ATC.

The master ring gage is now removed from the chuck and the date and degree markings are etched on the surface adjacent to the scribe lines.

The following is a procedure for making a master or reference plug gage from which working ring gages are made:

The master ring gage established as stated above is secured in the chuck of the horizontal rotary indexing head (located on the surface plate). Both master ring and plug gages are cleaned and lubricated with a light machine oil. The master plug gage is rotatively connected to the master ring gage until tight in accordance with API SPEC 7. The height stand equipped with the micrometer is used to locate the center of the master plug gage. When the center has been located, the stand is positioned at the outer surface of the master plug gage. The gages are rotated until the 0° scribe on the master ring gage is aligned with the master plug gage center height on the height stand. The surface of the master plug gage is coated with the blue dye then scribed, with the scriber on the height stand, at the center height location and later marked 0°.

The master plug gage is now removed from the master ring gage and the date and degree markings are etched on the surface adjacent to the scribe line. The master ring gage is then removed from the chuck. Both master gages are to be maintained in accordance with standard quality assurance procedures in order to maintain the integrity of these gages.

It will be appreciated that working gages can be established by the above-described procedure. Further, it is preferred in the present invention that master gages be established only to check reference gages which are used to establish and calibrate working gages as is described below.

II. SCRIBE LINE TRANSFER TO WORKING GAGES

A working ring gage is established from a reference or master plug gage, for purpose of illustration a reference plug gage is used. The reference plug gage and the working ring gage are cleaned and lubricated with a light machine oil. The working ring gage is secured in the chuck of the horizontal rotary indexing head (located on the surface plate). The reference plug gage is rotatively connected to the working ring gage until tight in accordance with API SPEC 7. The height stand equipped with the micrometer is used to locate the center height of the reference plug gage. When the center height has been located, the stand is positioned at the outer surface of the working ring gage. The indexing head is then rotated until the 0° scribe on the reference plug gage is in alignment with the center height at the height stand. The surface of the working ring gage is coated with the blue dye and then scribed, with the scriber on the height stand, at the center height location and later marked 0°.

The indexing head is now advanced by the angular distance indicative full torque make-up. For this example, the indexing head is advanced by 40° (ATC). The height stand still at the center height, now points to a location on the outer surface of the working ring gage to be coated with the blue dye then scribed, with the scriber, and later marked 40° ATC.

The reference plug gage is now removed from the working ring gage and the date and degree markings are etched on the surface adjacent to the scribe lines. The working ring gage may then be removed from the chuck. It will be appreciated that a reference ring gage can be established from a master plug gage in the same manner the working ring gage has been established.

A working plug gage is established from a reference or master ring gage, for purpose of illustration of a reference ring gage is used. The reference ring gage and the working plug gage are cleaned and lubricated with a light machine oil. The reference ring gage established hereinbefore is secured in the chuck of the horizontal rotary indexing head (located on the surface plate). The working plug gage is rotatively connected to the reference ring gage until tight in accordance with API SPEC 7. The height stand equipped with the micrometer is used to locate the center height of the working plug gage. When the center has been located, the stand is positioned at the outer surface of the working plug gage. The indexing head is then rotated until the 0° scribe on the reference ring gage is in alignment with the center height on the height stand. The surface of the working plug gage is coated with the blue dye and then scribed, with the scriber on the height stand, at the center height location and later marked 0°.

The working plug gage is now removed from the reference ring gage and the date and degree markings are etched on the surface adjacent to the scribe lines. The reference ring gage may then be removed from the chuck. It will be appreciated that a reference plug gage can be established from a master ring gage in the same manner the working plug gage has been established.

III. MANUFACTURING A ROTARY CONNECTION

Figure 2:
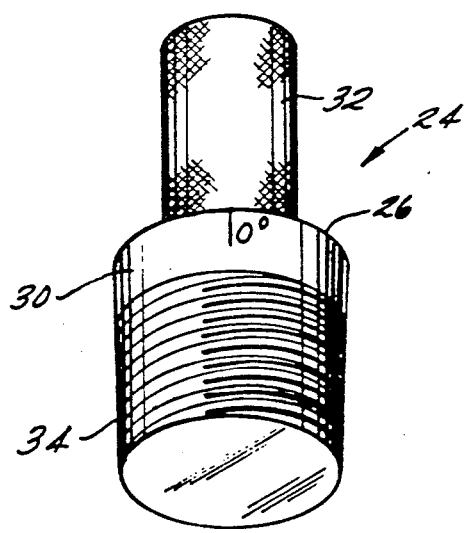
FIG. 2 is a perspective view of a plug gage in accordance with the present invention.

Referring to FIG. 1, a working ring gage 10 has a cylindrical shape with two flat surfaces 12 and 14. A smooth, precision cylindrical surface 16 suitable for marking depends upwardly from surface 12. A coarse cylindrical surface 18 depending downwardly from surface 14 and adjacent to surface 16 provides means for gripping gage 10. Gage 10 has a axial hole which has a threaded surface 22 for rotatively connecting with a pin end of a drill collar to be described hereinafter. Surface 16 has scribe marks for 0° and ATC (in this example 40°). Gage 10 has been scribed as described hereinbefore. Referring to FIG. 2, a working plug gage 24 has a generally cylindrical shape with a flat surface 26. A smooth cylindrical surface 30 suitable for marking is disposed between surfaces 26 and the thread 34. A coarse cylindrical member 32 extends normally upward from surface 26 to provide means for gripping gage 24. A threaded member 34 extends normally downward from surface 26 for rotatively connecting with a box end of a drill collar to be described hereinafter.

Figure 3:
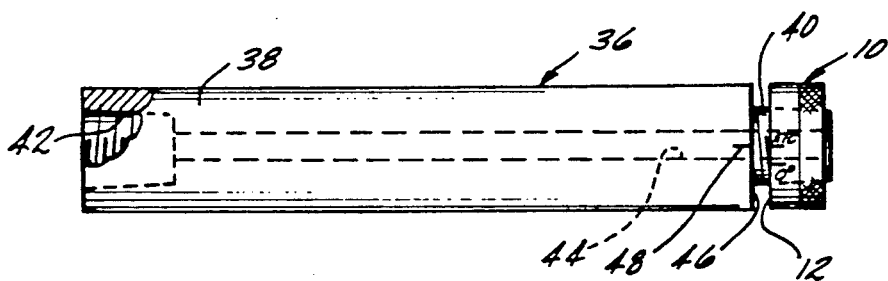
FIG. 3 is a side elevation view of a first tool which has the ring gage of FIG. 1 installed thereon.

Referring now to FIG. 3, a first tool or sub 36 comprises a drill collar 38 having a timed pin rotary connection 40 and a timed box rotary connection 42. An axial hole 44 through drill collar 38 is provided for the flow of drilling mud commonly used when drilling.

To manufacture a rotary connection in accordance with the present invention, ring gage 10 (FIG. 1) is rotatively connected to timed pin rotary connection 40 until gage 10 is tight in accordance with APC SPEC 7. The standoff, which is the distance between a shoulder 46 of drill collar 38 and surface 12 of gage 10, is measured with a caliper. The standoff is to be 1.1275" ±0.0025" for the present example. It will be appreciated that the standoff must be determined for various size drill collars and the above is only exemplary. If the standoff measurement is not within the desired tolerance, then shoulder 46 is faced off (i.e., machined) to achieve the correct standoff.

Once the standoff dimension is satisfied, gage 10 is properly installed and drill collar 38 is ready to be marked for a center line (i.e., angular datum). It should be noted that hatches or other features have not yet been machined in drill collar 38.

Drill collar 38 is coated with blue dye in the area adjacent to the ATC scribe on gage 10. A center line scribe 48 (i.e., angular datum) is scribed on drill collar 38 and is in angular alignment with the ATC scribe on gage 10. Scribe 48 corresponds to the center line or angular datum from which all subsequent machined features of collar 38 are located. The hathes or other features may now be located with respect to the center line and machined. Sensors are to be disposed in the hatches or otherwise.

Figure 4:
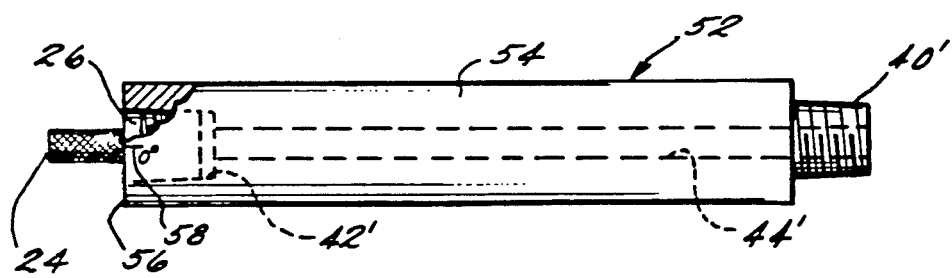
FIG. 4 is a side elevation view of a second tool, to be rotatively connected to the first tool of FIG. 3, which has the plug gage of FIG. 2 installed thereon.
Figure 5:
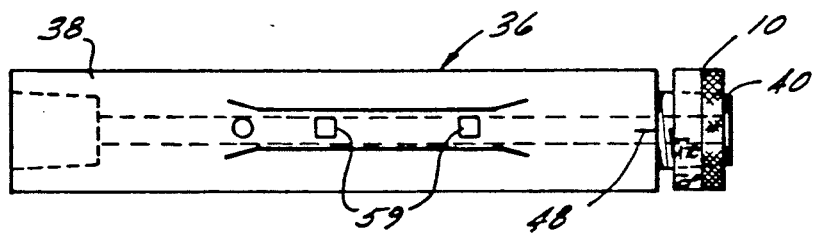
FIG. 5 is a side elevation view of the first tool of FIG. 3 which has features machined therein and which has the ring gage of FIG. 1 installed thereon.

The mating rotary connection needs to be manufactured using plug gage 24 (FIG. 2). Referring now to FIG. 4, a second tool or sub 52 comprises a drill collar 54 being the same as drill collar 38 (FIG. 3) and wherein like elements are numbered alike and include a prime.

Plug gage 24 is rotatively connected to box timed rotary connection 42' until gage 24 is tight in accordance with API SPEC 7. The standoff, which is the distance between a shoulder 56 of drill collar 54 and surface 26 of gage 24, is measured with the type of caliper used on drill collar 38 (FIG. 3). The standoff is to be 0.5025" ±0.0025" for the present example. It will again be appreciated that the standoff must be determined for various size drill collars and the above is only exemplary. If the standoff measurement is not within the desired tolerance, then shoulder 56 is faced off (i.e., machined) to achieve the correct standoff.

Once the standoff dimension is satisfied, gage 24 is properly installed and drill collar 54 is ready to be marked for a center line. It should be noted that hatches or other features have not yet been machined in drill collar 54. Drill collar 54 is coated with blue dye in the area adjacent to the 0° scribe on gage 24. A center line scribe 58 is scribed on drill collar 54 and is in angular alignment with the 0° scribe on gage 24. Scribe 58 corresponds to the center line or angular datum from which all subsequent machined features of collar 54 are located. Sensor features or hatches may now be located with respect to the center line and machines. Sensors may to be disposed in the hatches.

IV. REWORK OF A ROTARY CONNECTION

Identify the critical feature (e.g., center line of neutron porosity, density lithology, or focused gamma ray sensor) on a sub (not shown) to which the rotary connection is to be timed (i.e., reworked) and mark this angular location on the sub as the center line described hereinbefore. Machine the rotary connection to be timed onto the sub, leaving approximately 0.25 inch excess shoulder material for standoff adjustment. Mate the appropriate working gage (working plug gage 24 for timed box connection and working ring gage 10 for timed pin connection) to the machined connection to a tightness in accordance with API SPEC 7 and measure the angular difference of the appropriate timing mark on the gage (0° scribeline on plug gage 24, ATC line on ring gage 10) from the center line. If the missalignment exceeds ±5°, recalculate and recut the threads as necessary to bring the gage's timing line to within ±5° of the sub's center line. Face off the connection's shoulder to achieve the correct standoff dimension described hereinbefore.

V. INSPECTION OF THE ROTARY CONNECTION

When the machining of tool 36 or 52 is completed (e.g., machining of features 59 and 59') the rotary connections 40 or 42' respectively should be inspected. The inspection process of tool 36 comprises rotatively installing ring gage 10 onto pin 40 until gage 10 is tight in accordance with API SPEC 7. The standoff (described hereinbefore), is measured with a caliper. The standoff is to be 1.1275" ±0.0025" for the present example. This is the same standoff determined when manufacturing rotary connection 40. If the standoff dimension is satisfied then continue the inspection process, otherwise tool 36 fails inspection. Assuming the standoff was within the specified tolerance, the angular difference between scribe 48 on tool 36 and the ATC scribe on gage 10 is measured. The angular difference is to be less than ±5° for the timed pin rotary connection 40, otherwise tool 36 fails inspection.

Figure 6:
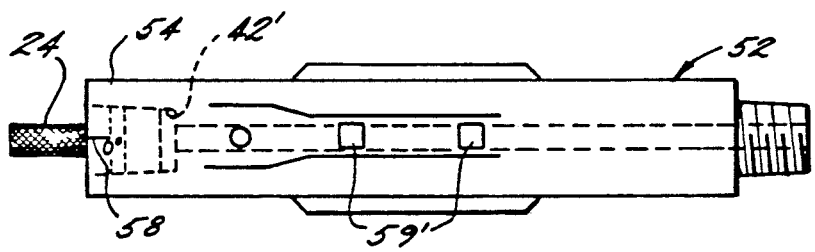
FIG. 6 is a side elevation view of the second tool of FIG. 4 which has features machined therein and which has the plug gage of FIG. 2 installed thereon.

Referring to FIG. 6, the mating box timed rotary connection 42' on tool 52 is also inspected. The inspection process of tool 52 comprises rotatively installing plug gage 24 onto box 42' until gage 24 is tight in accordance with API SPEC 7. The standoff (described hereinbefore) is measured with a caliper. The standoff is to be 0.5025" ±0.0025" for the present example. This is the same standoff determined when manufacturing rotary connection 42'. If the standoff dimension is satisfied, then continue the inspection process, otherwise tool 52 fails inspection. Assuming the standoff was within the specified tolerance, the angular difference between scribe 58 on tool 52 and the 0° scribe on gage 24 is measured. The angular difference is to be less than ±5° for the timed box rotary connection 42', otherwise tool 52 fails inspection.

VI. MAKING UP THE ROTARY CONNECTION

Figure 7:
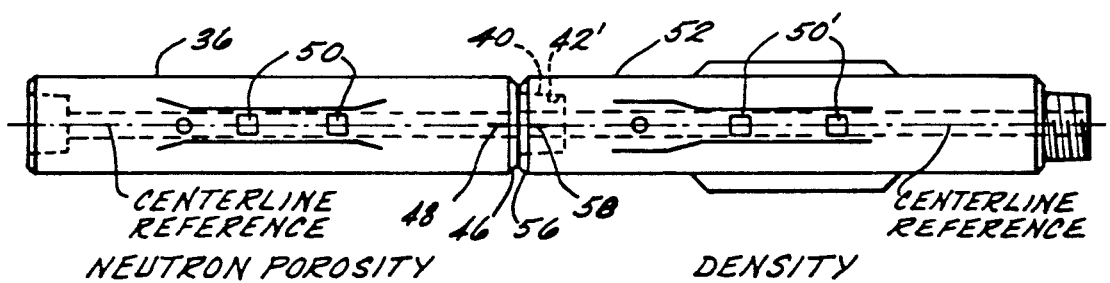
FIG. 7 is a side elevation view of the first tool of FIG. 5 rotatively connected to the second tool of FIG. 6, in accordance with the present invention.

Referring to FIG. 7, tools 36 and 52 are rotatively interconnected at full torque either in the field or at the factory prior to shipment. The sensors at features 59 and 59' from tools 36 and 52 respectively are in angular alignment, as preferred with directional type sensors. The angular alignment between tools 36 and 52 is verified by measuring the angular distance between scribe 48 on tool 36 and scribe 58 on tool 52. This angular distance is to be less than ±15°, otherwise one or both of the tools 36 and 52 required repair. This repair is generally not done in the field. The repair may require rework of the pin timed rotary connection as described hereinbefore. Field test have consistently provided angular distances well below the ±15°. Further, given the wide tolerance (±15°), a visual comparison may often suffice. The tools 36 and 52 may now be incorporated in the drill string, generally directly above the motor portion, described hereinbefore.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A method for angularly aligning a first tool having a male timed rotary connection and a second tool having a female timed rotary connection, comprising the steps of:

rotatively connecting a ring gage to said male timed rotary connection of said first tool, said ring gage having an outer surface with first and second scribe lines thereon, said second scribe line being angularly spaced an angular distance away from said first scribe line, said angular distance being indicative of full torque make-up of a rotary connection comprising said male timed rotary connection of said first tool and said female timed rotary connection of said second tool;

scribing a first reference line on said first tool corresponding to said second scribe line on said ring gage;

rotatively connecting a plug gage to said female timed rotary connection of said second tool, said plug gage having an outer surface with a third scribe line thereon, said third scribe line corresponding to said first scribe line on said ring gage and being indicative of hand tight face-up of said rotary connection; and scribing a second reference line on said second tool corresponding to said third scribe line on said plug gage, wherein when said rotary connection is fully torqued up, said first reference line is within a specified angular alignment with said second reference line.

2. The method of claim 1 wherein said ring gage comprises:

said outer surface of said ring gage being generally cylindrical;

a threading inner cylindrical surface, said inner surface being disposed within said outer surface, said inner surface for rotatively connecting to said male timed rotary connection of said first tool;

a first surface at one end of said inner and outer surfaces, said first surface depending from said inner surface to said outer surface;

a second surface at one end of said inner and outer surfaces, said first surface depending from said inner surface to said outer surface, said second surface being opposite said first surface;

said first scribe line disposed on said outer surface; and said second scribe line disposed on said outer surface, said second scribe line being an angular distance away from said first scribe line, said angular distance being indicative of full torque make-up of said rotary connection.

3. The method of claim 2 wherein said first scribe line on said ring gage is indicated as 0°.

4. The method of claim 2 wherein said second scribe line on said ring gage is indicated as advanced timing correction.

5. The method of claim 1 wherein said plug gage comprises:

said outer surface of said plug gage being generally cylindrical;

a first surface at one end of said outer surface;

a cylindrical member extending normally away from said first surface;

a threaded member extending normally downward from said cylindrical member, said threaded member for rotatively connecting to said female timed rotary connection of said second tool;

said third scribe line disposed on said outer surface, said third scribe line indicative of hand tight face-up of said rotary connection.

6. The method of claim 1 wherein said third scribe line on said plug gage is indicated as 0°.

7. The method of claim 1 wherein said angular alignment is ±15°.

8. The method of claim 1 further includes:

measuring a ring gage standoff, said ring gage standoff being the distance between one side of said ring gage and a first shoulder of said male timed rotary connection of said first tool, said ring gage standoff to be a first predetermined value within a first specified tolerance;

machining said first shoulder to achieve said first tolerance when said first tolerance is not met;

measuring a plug gage standoff, said plug gage standoff being the distance between one side of said plug gage and a second shoulder of said female timed rotary connection of said second tool, said plug gage standoff to be a second predetermined value within a second specified tolerance; and machining said second shoulder to achieve said second tolerance when said second tolerance is not met.

9. The method of claim 8 wherein said first specified tolerance is the same as said second specified tolerance.

10. The method of claim 9 wherein said first and second specified tolerance is ±0.0025 inches.

11. The method of claim 8 wherein said first predetermined value is the same as said second predetermined value.

12. The method of claim 1 wherein said first reference line on said first tool is the angular datum from which subsequent machined features of said first tool are located.

13. The method of claim 1 wherein said second reference line on said second tool is the angular datum from which subsequent machined features of said second tool are located.

14. A method for establishing an advance timing correction on; a ring gage having an outer cylindrical surface and an inner threaded cylindrical surface, and a plug gage having an outer cylindrical surface and a threaded protruding member; said gages for use when manufacturing a rotary connection between a first tool having a male timed rotary connection and a second tool having a female timed rotary connection, comprising the steps of:

securing said ring gage in a rotary indexing head, said indexing head disposed on a flat surface, said ring gage being positioned such that said outer cylindrical surface of said ring gage is parallel to said flat surface;

locating a center height of said ring gage, said center height indicative of the distance from said flat surface to the center of said ring gage;

scribing a first line on said outer cylindrical surface of said ring gage at said center height;

rotating said ring gage by an angular distance indicative of full torque make-up for said rotary connection;

scribing a second line on said outer cylindrical surface of said ring gage at said center height;

rotatively connecting said plug gage to said ring gage until tightened by a preselect amount; and scribing a third line on said outer cylindrical surface of said plug gage corresponding to said first line on said ring gage.

15. The method of claim 14 wherein said preselected amount is tightness in accordance with API SPEC 7.

16. An apparatus which has angularly aligned rotary connection comprising:

a first elongated cylindrically shaped tool which has a male timed rotary connection disposed at one end and a first reference line thereon; and a second elongated cylindrically shaped tool which has a female timed rotary connection disposed at one end, said female connection rotatively connected to said male connection of said first tool, said second tool has a second reference line thereon, whereby said second reference line is within a specified general angular alignment with said first reference line when said female and male connections are fully torqued.

17. The apparatus of claim 16 further includes:

a first feature disposed at a predetermined angular datum from said first reference line on said first tool, said first feature for housing a first sensor; and a second feature disposed at a predetermined angular datum from said second reference line on said second tool, said second feature for housing a second sensor, whereby said second sensor is in general angular alignment with said first sensor when said female and male connections are fully torqued.

18. The apparatus of claim 17 wherein said first and second sensors are focused formation evaluation sensors.

19. The apparatus of claim 16 wherein said angular alignment is ±15°.

20. A method for inspecting a male timed rotary connection of a first tool and female timed rotary connection of a second tool, comprising the steps of:

rotatively connecting a ring gage to said male timed rotary connection of said first tool, said ring gage has an outer surface with first and second scribe lines thereon, said second scribe line being an angular distance away from said first scribe line, said angular distance being indicative of full torque make-up of a rotary connection comprising said male timed rotary connection of said first tool and said female timed rotary connection of said second tool, said first tool has a first reference line thereon corresponding to said second scribe line on said ring gage;

measuring a first angular distance between said first reference line on said first tool and said second scribe line of said ring gage, said first angular distance to be within a first specified angular tolerance;

rotatively connecting a plug gage to said female timed rotary connection of said second tool, said plug gage has an outer surface with a third scribe line thereon, said third scribe line corresponding to said first scribe line on said ring gage and being indicative of a preselected tightness of said rotary connection, said second tool has a second reference line thereon corresponding to said third scribe line on said plug gage; and measuring a second angular distance between said second reference line on said second tool and said third scribe line of said plug gage, said second angular distance to be within a second specified angular tolerance.

21. The method of claim 20 wherein said first specified angular tolerance is the same as said second specified angular tolerance.

22. The method of claim 21 wherein said first and second specified angular tolerance is ±5°.

23. The method of claim 20 wherein said preselected tightness is tightness defined in API SPEC 7.

24. A method of reworking a timed rotary connection of a tool having a sensor disposed thereon; comprising the steps of:

(1) machining said timed rotary connection to a preselected distance above a specified standoff;

(2) scribing a first line on said tool, said first line being in angular alignment with said sensor;

(3) rotatively connecting a gage to said timed rotary connection of said tool until tightened by a preselected amount, said gage having at least one second line scribed thereon;

(4) measuring a angular distance between said first line on said tool and said second line on said gage, said angular distance to be within a specified angular tolerance; and (5) facing off the shoulder of said tool to said specified standoff.

25. The method of claim 24 further comprising: recalculate said timed rotary connection; and repeat steps (1)-(5).

26. The method of claim 24 wherein said timed rotary connection is a male timed rotary connection.

27. The method of claim 26 wherein said gage comprises:

a ring gage having an outer surface with said second line and a third line scribed thereon, said second line being indicative of full torque make-up and said third line being indicative of hand tight face-up of a rotary connection comprising said male timed rotary connection of said tool and a female timed rotary connection of another tool.

28. The method of claim 24 wherein said preselected amount is tightness in accordance with API SPEC 7.

29. The method claim 25 wherein said specified angular tolerances is ±5°.

30. The method of claim 25 wherein said preselected distance is about 0.25 inch.

31. The method of claim 25 wherein said timed rotary connection is a female timed rotary connection.

32. The method of claim 31 wherein said gage comprises:

a plug gage having an outer surface with said second line scribed thereon, said second line being indicative of hand tight face-up of a rotary connection comprising said male timed rotary connection of said tool and a female timed rotary connection of another tool.

* * * * *

UNITED STATES PATENT AND TRADEMARK OFFICE
CERTIFICATE OF CORRECTION

PATENT NO. : 5,134,783

DATED : August 4, 1992

INVENTOR(S) : Carl A. Perry

It is certified that error appears in the above-indentified patent and that said Letters Patent is hereby corrected as shown below:

Col. 3, line 39: Delete "or" and insert therefor --of--.

Col. 4, line 4: Delete "gages".

Col. 4, line 33: Delete " t " and insert therefor --to--.

Col. 5, line 40: Delete "of", second occurrence.

Col. 6, line 48: Delete "hathes" and insert therefor --hatches--.

Col. 7, line 12: Delete "machines" and insert therefor --machined--.

Col. 7, line 14: Delete "may to be" and insert therefore --may be--.

Col. 8, line 13: Delete "required" and insert therefor --require--.

Col. 8, line 16: Delete "test" and insert therefor --tests--.

UNITED STATES PATENT AND TRADEMARK OFFICE
CERTIFICATE OF CORRECTION

PATENT NO. : 5,134,783
DATED : August 4, 1992
INVENTOR(S) : Carl A. Perry

It is certified that error appears in the above-indentified patent and that said Letters Patent is hereby corrected as shown below:

Col. 12, line 29: Delete "The method claim" and insert therefor --The method of claim--.

Signed and Sealed this

Eighth Day of March, 1994

*Attest:*

BRUCE LEHMAN

*Attesting Officer*     Commissioner of Patents and Trademarks